(12) United States Patent
Taki (10) Patent No.: US 9,645,522 B2
(45) Date of Patent: May 9, 2017

(54) OPTICAL SCANNING APPARATUS

(71) Applicant: CANON KABUSHIKI KAISHA, Tokyo (JP)

(72) Inventor: Yoshiyuki Taki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/077,465

(22) Filed: Mar. 22, 2016

(65) Prior Publication Data
US 2016/0291500 A1 Oct. 6, 2016

(30) Foreign Application Priority Data

Mar. 31, 2015 (JP) ................................. 2015-072378
Feb. 22, 2016 (JP) ................................. 2016-030654

(51) Int. Cl.
| | |
|---|---|
| *G02B 26/10* | (2006.01) |
| *G03G 15/00* | (2006.01) |
| *G03G 15/043* | (2006.01) |
| *G02B 13/00* | (2006.01) |
| *G02B 26/12* | (2006.01) |
| *G02B 27/00* | (2006.01) |
| *G03G 15/04* | (2006.01) |

(52) U.S. Cl.
CPC ....... *G03G 15/043* (2013.01); *G02B 13/0005* (2013.01); *G02B 26/125* (2013.01); *G02B 27/0025* (2013.01); *G03G 15/0435* (2013.01); *G03G 15/04072* (2013.01)

(58) Field of Classification Search
CPC ..................................................... G03G 15/043
USPC .............................................................. 399/4
See application file for complete search history.

(56) References Cited

U.S. PATENT DOCUMENTS

2015/0338647 A1* 11/2015 Ishihara ............... G03G 15/043
347/118

FOREIGN PATENT DOCUMENTS

| JP | H08-076011 A | 3/1996 |
|---|---|---|
| JP | 2003-337295 A | 11/2003 |
| JP | 2007-045094 A | 2/2007 |

* cited by examiner

*Primary Examiner* — Quana M Grainger
(74) *Attorney, Agent, or Firm* — Carter, DeLuca, Farrell & Schmidt, LLP (57) ABSTRACT

Provided is an optical scanning apparatus, including: a deflection unit; and an imaging optical element (IOE) guiding a light flux deflected by deflection unit onto a scanned surface, in which, an fθ coefficient of IOE, a focal length of IOE, and when an intersection between deflection unit and an optical axis of IOE is set as an origin, a coordinate in an optical axis direction (OAD) of an intersection between a principal ray of an outermost off-axis light flux and an incident surface of IOE, a coordinate in OAD of an intersection between principal ray of outermost off-axis light flux and an exit surface of IOE, a coordinate in OAD of an intersection between a principal ray of an on-axis light flux and the incident surface, and a coordinate in OAD of an intersection between principal ray of on-axis light flux and the exit surface are appropriately set.

6 Claims, 5 Drawing Sheets

OPTICAL SCANNING APPARATUS

BACKGROUND OF THE INVENTION

Field of the Invention

The present invention relates to an optical scanning apparatus, which is suitable for an image forming apparatus such as a laser beam printer, a digital copying machine, or a multi-function printer.

Description of the Related Art

In order to record image information with high precision, an optical scanning apparatus mounted in an image forming apparatus such as a laser beam printer is required to have field curvature satisfactorily corrected over the entire area of a scanned surface and have a uniform spot diameter, as well as to have distortion (fθ characteristics) in which an angle of incident rays and an image height have a proportional relationship.

In a sub-scanning section of a scanning optical system of the optical scanning apparatus, there is a need to cause a diverging light flux from a deflection unit to form an image on the scanned surface at a predetermined magnification, with the result that a refractive power is stronger than in a main scanning section, and aberrations generated in the scanning optical system is thus difficult to correct.

Further, along with reductions in size and cost of the image forming apparatus, the optical scanning apparatus is also required to be reduced in cost.

In each of Japanese Patent Application Laid-Open No. H08-76011, Japanese Patent Application Laid-Open No. 2003-337295, and Japanese Patent Application Laid-Open No. 2007-45094, there is proposed means for realizing both the demands of satisfactory correction of the aberrations and the like and the reduction in cost in an optical scanning apparatus.

In Japanese Patent Application Laid-Open No. H08-76011, there is proposed an optical scanning apparatus in which a scanning optical system is formed of one toric lens to satisfactorily correct field curvature, the distortion, and the like, and to reduce influences of jitter caused by an error in manufacturing a deflection unit and a change in spot diameter in a sub-scanning direction depending on an image height.

In Japanese Patent Application Laid-Open No. 2003-337295, there is proposed an optical scanning apparatus suitable for high-definition printing, in which, in order to reduce influences of changes in an environment such as temperature and the like on performance, a scanning optical system is formed of one lens, and an incident optical system has a diffraction optical surface.

In Japanese Patent Application Laid-Open No. 2007-45094, there is proposed a scanning optical system capable of improving yield even when the number of parts is reduced.

In order to realize the reduction in cost in the optical scanning apparatus, it is effective to use a toric lens manufactured by plastic injection molding in the scanning optical system, and hence to increase the number of lenses obtained in one injection molding cycle, and for that purpose, it is effective to reduce a length of the lens. However, in general, the reduction in length of the lens leads to deterioration in the field curvature, the distortion, and the like.

SUMMARY OF THE INVENTION

In view of the above-mentioned circumstances, the present invention has an object of providing an optical scanning apparatus in which a scanning optical system is formed of one lens to effectively correct field curvature and distortion, and hence which is capable of realizing both an increase in definition and a reduction in cost.

Thus, according to one embodiment of the present invention, there is provided an optical scanning apparatus, including: a deflection unit configured to deflect a light flux to scan a scanned surface with light in a main scanning direction; and an imaging optical element configured to guide the light flux that has been deflected by the deflection unit onto the scanned surface, in which the following conditional expressions are satisfied:

$$0.65 < f_\theta / f_s < 1.00$$

$$0.30 < (X_{1max} - X_{10}) / (X_{20} - X_{10}) < 0.49$$

$$-0.24 < (X_{2max} - X_{20}) / (X_{20} - X_{10}) < -0.06$$

where $f_\theta$ represents an fθ coefficient of the imaging optical element, $f_s$ represents a focal length of the imaging optical element, and when an intersection between the deflection unit and an optical axis of the imaging optical element is set as an origin, $X_{1max}$ (mm) represents a coordinate in an optical axis direction of an intersection between a principal ray of an outermost off-axis light flux and an incident surface of the imaging optical element, $X_{2max}$ (mm) represents a coordinate in the optical axis direction of an intersection between the principal ray of the outermost off-axis light flux and an exit surface of the imaging optical element, $X_{10}$ (mm) represents a coordinate in the optical axis direction of an intersection between a principal ray of an on-axis light flux and the incident surface, and $X_{20}$ (mm) represents a coordinate in the optical axis direction of an intersection between the principal ray of the on-axis light flux and the exit surface.

Further features of the present invention will become apparent from the following description of exemplary embodiments with reference to the attached drawings.

DESCRIPTION OF THE EMBODIMENTS

Now, an optical scanning apparatus according to the present invention is described with reference to the drawings. Note that, the drawings to be described below may not be drawn to scale in order to facilitate understanding of the present invention.

Note that, in the following description, a main scanning direction corresponds to a direction perpendicular to a rotation axis of a deflection unit and an optical axis of an optical system, and a sub-scanning direction corresponds to a direction parallel to the rotation axis of the deflection unit. Moreover, a main scanning section corresponds to a cross section perpendicular to the sub-scanning direction, and a sub-scanning section corresponds to a cross section including the optical axis of the optical system and the sub-scanning direction. Therefore, it should be noted that the main scanning direction and the sub-scanning section change depending on the optical system.

As described above, in order to reduce a manufacturing cost of the optical scanning apparatus, it is effective to minimize the number of scanning lenses, that is, to form a scanning optical system (imaging optical system) of one scanning lens (fθ lens). Then, it is preferred that the one scanning lens be formed of a toric lens manufactured by injection molding of a plastic material, and that a length and a thickness of the lens be reduced to increase the number of lenses obtained in one injection molding cycle.

The length and the thickness of the scanning lens may be reduced by bringing the scanning lens as close as possible to the deflection unit.

On the other hand, when a back focus of the scanning optical system is reduced, in order to secure a predetermined printing area, a rotation angle of the deflection unit for reaching a maximum image height is increased, which leads to an increase in size of the scanning lens. Therefore, in order to reduce the size of the scanning lens, it is preferred to bring the scanning lens as close as possible to the deflection unit, and to increase an fθ coefficient of the scanning lens.

The fθ coefficient is defined here as a value of h/(2×θ pm) based on a scanning image height h and a polygon rotation angle θ pm, from which it can be seen that the scanning image height h and the polygon rotation angle θ pm are in a proportional relationship. In a case where a light flux deflected by the deflection unit is completely parallel rays, the fθ coefficient is consistent with a focal length of the scanning optical system. A degree of convergence of the light flux deflected by the deflection unit may be changed to arbitrarily change the fθ coefficient.

In order to refract the light flux deflected by the deflection unit and collect the light flux at a predetermined image height, the scanning lens needs to have a convex refractive power. In other words, in order to attain high optical performance and a reduction in cost, there is a need to increase the convex refractive power of the scanning lens in a scanning optical system having a long back focus.

In view of the above-mentioned circumstances, a degree of convergence of a light flux by an incident optical system and the focal length of the scanning optical system may be balanced, and further, an aspherical shape of the scanning lens may approximate a shape concentric to a deflection point with respect to the deflected light flux to realize both the high optical performance and the reduction in cost.

As described above, the scanning lens may be brought closer to the deflection unit to reduce the size of the scanning lens, and hence to reduce the cost. However, when the scanning lens is brought closer to the deflection unit, a magnification in the sub-scanning section of the scanning lens is increased. Therefore, in a case where there is an error in manufacturing the deflection unit, a displacement of a printing position in the sub-scanning section (unevenness of pitch) is increased. Therefore, among the deflection unit, the scanning optical system, and a scanned surface, there is a need to balance between the reduction in size of the scanning lens and the displacement of the printing position.

Further, there is also a need to appropriately set a center thickness of the scanning lens to balance optical performance and the manufacturing cost.

As lenses forming the incident optical system, in general, a collimator lens configured to convert a light flux, which is emitted from a light source, into substantially parallel rays in the main scanning section, and a cylindrical lens configured to converge a light flux to be collected on a deflecting surface of the deflection unit in the sub-scanning section are provided. Actions of those two lenses may be obtained also by one anamorphic collimator lens. Therefore, instead of providing the collimator lens and the cylindrical lens, the anamorphic collimator lens may be provided to enable a further reduction in cost of the optical scanning apparatus. Further, one surface of the anamorphic collimator lens may be formed into a diffraction grating shape to correct a displacement of a focus position due to a change in temperature.

Next, the optical scanning apparatus according to the present invention is described in detail with reference to the drawings.

Figure 1:
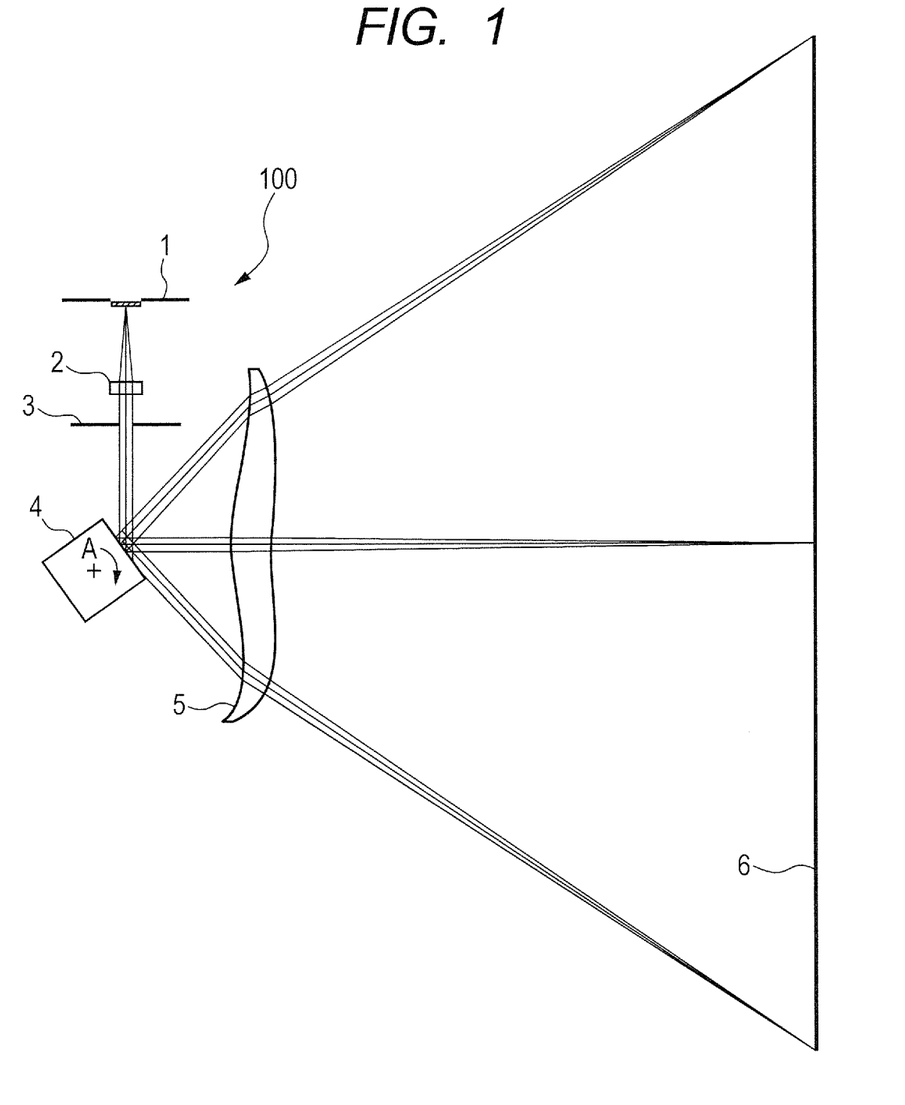
FIG. 1 is a schematic view of a main scanning section of an optical scanning apparatus according to a first embodiment of the present invention.

FIG. 1 is a schematic view of a main scanning section of an optical scanning apparatus 100 according to a first embodiment of the present invention.

The optical scanning apparatus 100 includes a light source 1, an anamorphic collimator lens 2, an aperture stop 3, a deflection unit (polygon mirror) 4, and a scanning lens (imaging optical element) 5.

The light source 1 is formed of a semiconductor laser, for example.

The anamorphic collimator lens 2 is configured to convert a light flux that has been emitted from the light source 1 into a substantially parallel light flux in the main scanning section, and collect the light flux on a deflecting surface of the deflection unit 4 in the sub-scanning section. Note that, the term "substantially parallel light flux" as used herein includes a weakly diverging light flux, a weakly converging light flux, and a parallel light flux.

The aperture stop 3 is configured to adjust light flux widths of an incident light flux in the main scanning direction and the sub-scanning direction.

Note that, the light source 1, the anamorphic collimator lens 2, and the aperture stop 3 form the incident optical system of the optical scanning apparatus 100.

The deflection unit 4 is a rotary polygon mirror configured to be rotated by a driving unit (not shown) such as a motor in the direction indicated by the arrow A in FIG. 1 at a constant speed, and to deflect/reflect a light flux that has entered from the incident optical system.

The scanning lens 5 is an fθ lens having fθ characteristics, and is configured to collect (guide) the light flux that has been deflected/reflected by the deflection unit 4 on a scanned surface 6. Note that, the scanning lens 5 forms an imaging optical system (scanning optical system) of the optical scanning apparatus 100.

The optical scanning apparatus 100 according to the present invention may satisfy the following conditional expressions (1), (2), and (3) to realize both the reduction in size and the high optical performance:

$$0.65 < f_\theta / f_s < 1.00 \quad (1)$$

$$0.30 < (X_{1max} - X_{10})/(X_{20} - X_{10}) < 0.49 \quad (2)$$

$$-0.24 < (X_{2max} - X_{20})/(X_{20} - X_{10}) < -0.06 \quad (3).$$

In the expressions, $f_\theta$ represents an fθ coefficient of the scanning optical system of the optical scanning apparatus 100, and $f_s$ represents a focal length of the scanning optical system of the optical scanning apparatus 100.

Figure 2:
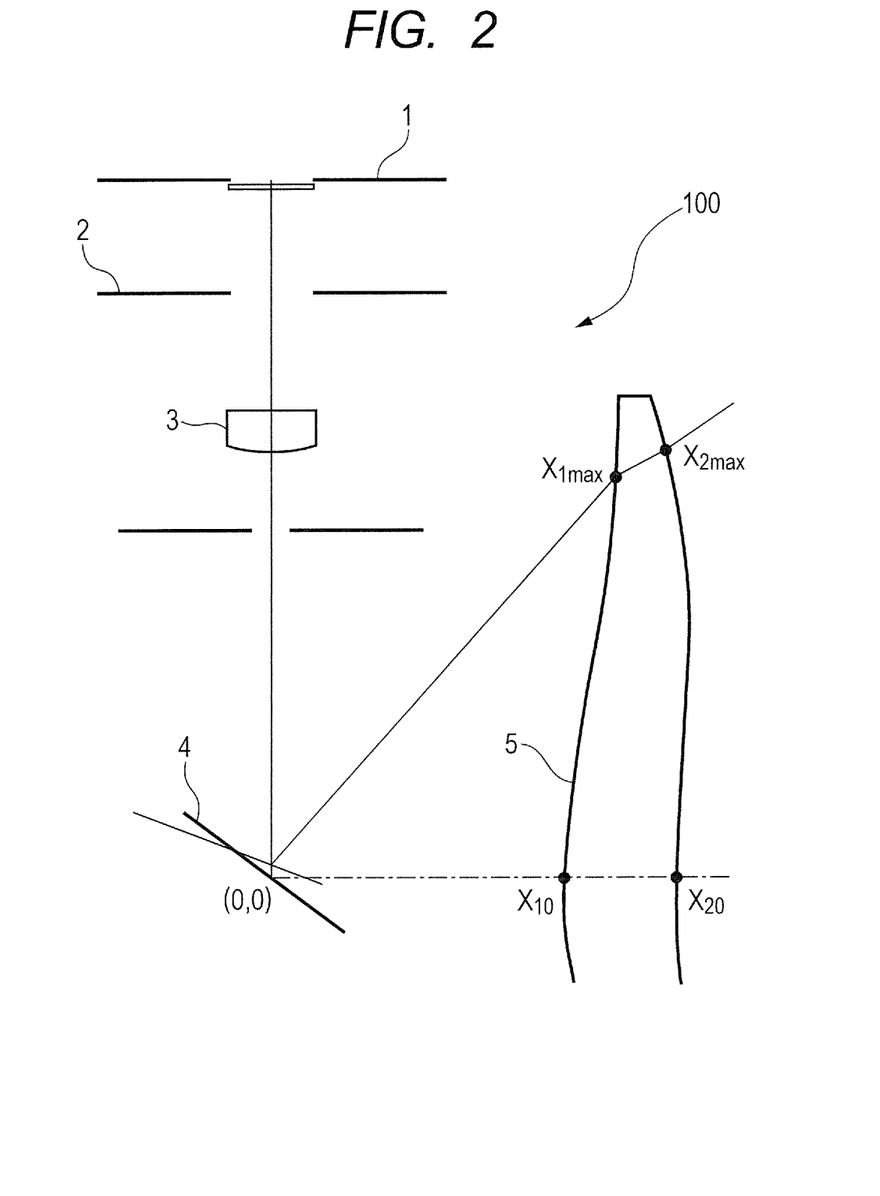
FIG. 2 is an enlarged schematic view of the main scanning section of the optical scanning apparatus according to the first embodiment.

$X_{1max}$, $X_{2max}$, $X_{10}$, and $X_{20}$ are coordinates illustrated in FIG. 2. More specifically, $X_{1max}$ (mm) is a coordinate in an optical axis direction at which a principal ray of the light flux (outermost off-axis light flux) at an outermost off-axis image height (scanning outermost off-axis image height) in the main scanning direction passes through an optical surface (incident surface) of the scanning lens 5 on the deflection unit 4 side. $X_{2max}$ (mm) is a coordinate in the optical axis direction at which the principal ray of the light flux at the outermost off-axis image height in a main scanning direction passes through an optical surface (exit surface) of the scanning lens 5 on the scanned surface 6 side. $X_{10}$ (mm) is a coordinate in the optical axis direction at which a principal ray of a light flux (on-axis light flux) at an on-axis image height (scanning on-axis image height) in the main scanning direction passes through the optical surface of the scanning lens 5 on the deflection unit 4 side. $X_{20}$ (mm) is a coordinate in the optical axis direction at which the principal ray of the light flux at the on-axis image height in the main scanning direction passes through the optical surface of the scanning lens 5 on the scanned surface 6 side. Note that, an origin here is an intersection of the deflection unit 4 and an optical axis of the on-axis light flux.

The conditional expression (1) represents a ratio between the fθ coefficient and the focal length of the scanning optical system in the optical scanning apparatus 100. When a light flux that enters the scanning optical system tends to diverge too much and the ratio exceeds the upper limit of the conditional expression (1), a refractive power of the scanning optical system becomes strong, and optical performance of field curvature and the fθ characteristics deteriorates. On the other hand, when the light flux that enters the scanning optical system tends to converge too much and the ratio falls below the lower limit of the conditional expression (1), the refractive power of the scanning optical system becomes weak, which leads to an increase in size of the optical scanning apparatus 100.

The conditional expressions (2) and (3) indicate differences in the optical axis direction between positions of each of the optical surfaces at which scanning rays pass the scanning outermost off-axis image height and the scanning on-axis image height in the scanning lens 5 forming the scanning optical system, and represent an aspherical shape of each of the optical surfaces.

The conditional expressions (2) and (3) are simultaneously satisfied so that aspherical shapes of the scanning lens 5 approximate a direction of a concentric circle with respect to the scanning rays, with the result that generation of aberrations may be suppressed to guide the rays to the scanning image height.

When the ratios exceed the upper limit of the conditional expression (2) and fall below the lower limit of the conditional expression (3), respectively, the scanning lens 5 approximates a biconvex shape in the main scanning section. In this case, a positive refractive power becomes strong to adversely affect the optical performance such as the field curvature and the fθ characteristics.

When the ratios fall below the lower limit of the conditional expression (2) and exceed the upper limit of the conditional expression (3), respectively, the scanning lens 5 approximates a biconcave shape in the main scanning section. Also in this case, the optical performance such as the field curvature and the fθ characteristics is adversely affected.

When the ratios exceed the upper limit of the conditional expression (2) and the upper limit of the conditional expression (3), respectively, a negative refractive power of the scanning lens 5 is increased to deteriorate the field curvature and the fθ characteristics.

When the ratios fall below the lower limit of the conditional expression (2) and the lower limit of the conditional expression (3), respectively, a positive refractive power of the scanning lens 5 is increased to deteriorate the field curvature and the fθ characteristics.

Moreover, it is more preferred that the optical scanning apparatus 100 according to the present invention satisfy the following conditional expressions (1)', (2)', and (3)':

$$0.75 < f_\theta/f_s < 0.95 \tag{1}'$$

$$0.30 < (X_{1max} - X_{10})/(X_{20} - X_{10}) < 0.47 \tag{2}'$$

$$-0.22 < (X_{2max} - X_{20})/(X_{20} - X_{10}) < -0.07 \tag{3}'.$$

In addition to satisfying the conditional expressions (1), (2), and (3), it is further preferred that the optical scanning apparatus 100 according to the present invention satisfy the following conditional expressions (4), (5), and (6):

$$0.20 \leq T2/Sk \leq 0.30 \tag{4}$$

$$0.05 \leq d/f_\theta \leq 0.08 \tag{5}$$

$$3.0 < |\beta s| < 4.0 \tag{6}.$$

In the expressions, T2 represents a distance from the deflecting surface of the deflection unit 4 to the optical surface of the scanning lens 5 on the scanned surface 6 side, Sk represents a distance from the optical surface of the scanning lens 5 on the scanned surface 6 side to the scanned surface 6, d represents the thickness of the scanning lens 5, and βs is a paraxial lateral magnification of the scanning optical system in the sub-scanning section.

The conditional expression (4) represents a conditional expression regarding a position of the scanning lens 5. When the scanning lens 5 is brought too close to the scanned surface 6 and the ratio exceeds the upper limit of the conditional expression (4), a length of the scanning lens 5 is increased, and the number of lenses obtained in one injection molding cycle is decreased, which is detrimental to the reduction in cost. On the other hand, when the scanning lens 5 is brought too close to the deflecting unit 4 and the ratio falls below the lower limit of the conditional expression (4), sensitivity to the displacement of the printing position accompanying an increase in sub-scanning magnification is increased.

The conditional expression (5) is a conditional expression regarding the thickness of the scanning lens 5. When the thickness of the scanning lens 5 becomes too large and the ratio exceeds the upper limit of the conditional expression (5), the number of lenses obtained in one injection molding cycle is decreased, which is detrimental to the reduction in cost. On the other hand, when the thickness of the scanning lens 5 becomes too small and the ratio falls below the lower limit of the conditional expression (5), the scanning lens 5's share of refractive power is increased, and it becomes difficult to maintain good optical performance such as the field curvature and the fθ characteristics.

The conditional expression (6) is a conditional expression regarding the paraxial lateral magnification in the sub-scanning section of the scanning optical system, that is, the so-called sub-scanning magnification. When the sub-scanning magnification becomes too large and the ratio exceeds the upper limit of the conditional expression (6), the sensitivity to the displacement of the printing position becomes high. On the other hand, when the sub-scanning magnification becomes too small and the ratio falls below the lower limit of the conditional expression (6), the scanning lens 5 is increased, and the number of lenses obtained in one injection molding cycle is decreased, which is detrimental to the reduction in cost.

Moreover, it is more preferred that the optical scanning apparatus 100 according to the present invention satisfy the following conditional expressions (4)', (5)', and (6)':

$$0.23 \leq T2/Sk \leq 0.28 \quad (4)'$$

$$0.06 \leq d/f_\theta \leq 0.07 \quad (5)'$$

$$3.2 < |\beta s| < 3.8 \quad (6)'$$

In Table 1, numerical values regarding respective optical members forming the optical scanning apparatus 100 are shown. Now, the optical scanning apparatus 100 based on the numerical values shown in Table 1 is referred to as Numerical Example 1.

TABLE 1

| | |
|---|---|
| Wavelength of light flux [nm] | 790 |
| Number of surfaces of deflection unit | 4 |
| Rotation angle of deflection unit [±deg] | 24.21 |
| Diameter of circumcircle of deflection unit [mm] | 50 |
| Distance from deflecting surface to incident surface of scanning lens [mm] | 21.73 |
| Coordinate X of center of rotation of deflection unit | −5.69 |
| Coordinate Y of center of rotation of deflection unit | −4.31 |
| Incident angle in main scanning direction [deg] | 90 |
| Incident angle in sub-scanning direction [deg] | 0 |
| Focal length in main scanning direction of fθ lens [mm] | 156.34 |
| Scanning field angle [deg] | 96.85 |
| Distance from exit surface of scanning lens to scanned surface [mm] | 111.57 |

| Shape of fθ lens | | | | |
|---|---|---|---|---|
| | First surface | | Second surface | |
| | Upper | Lower | Upper | Lower |
| R | 41.749 | 41.749 | 79.388 | 79.388 |
| K | 0.019 | 0.019 | 0.038 | 0.038 |
| B4 | −2.269135E−05 | −2.513327E−05 | −1.343831E−05 | −1.525243E−05 |
| B6 | 2.512062E−08 | 3.339225E−08 | 7.632032E−09 | 1.254783E−08 |
| B8 | −1.759863E−11 | −3.020962E−11 | 2.151709E−12 | −3.451504E−12 |
| B10 | −1.487141E−15 | 3.820325E−15 | −5.957351E−15 | −4.967969E−15 |
| B12 | 6.039159E−18 | 1.384229E−17 | 1.050423E−18 | 4.318409E−19 |
| B14 | −3.324761E−21 | −9.209626E−21 | 2.531345E−21 | 4.409522E−21 |
| B16 | 3.166201E−25 | 1.316907E−24 | −1.208210E−24 | −2.262911E−24 |
| r | −1.075819E+01 | −1.075819E+01 | −7.370283E+00 | −7.370283E+00 |
| E2 | 2.534721E−04 | 3.777978E−04 | 1.630722E−04 | 2.207946E−04 |
| E4 | −3.395165E−07 | −9.011154E−07 | −3.001768E−07 | −5.176314E−07 |
| E6 | 3.264075E−10 | 1.125816E−09 | 4.896567E−10 | 1.049355E−09 |
| E8 | −2.501132E−13 | −3.982774E−13 | −3.838475E−13 | −1.611345E−12 |
| E10 | 1.076209E−16 | −1.994684E−16 | 3.735383E−17 | 1.575724E−15 |
| E12 | −6.326132E−21 | 2.215273E−20 | 6.192803E−20 | −6.803108E−19 |
| E14 | −6.648042E−24 | 8.705875E−23 | 1.946861E−23 | 2.231538E−23 |
| E16 | 9.566047E−27 | −5.765044E−26 | −1.669838E−26 | 8.177753E−27 |

Similarly, in Table 2, numerical values regarding respective optical members forming the optical scanning apparatus 100 and having structures different from Numerical Example 1 are shown. Now, the optical scanning apparatus 100 based on the numerical values shown in Table 2 is referred to as Numerical Example 2.

TABLE 2

| | |
|---|---|
| Wavelength of light flux [nm] | 790 |
| Number of surfaces of deflection unit | 4 |
| Rotation angle of deflection unit [±deg] | 24.21 |
| Diameter of circumcircle of deflection unit [mm] | 50 |
| Distance from deflecting surface to incident surface of scanning lens [mm] | 20.12209 |
| Coordinate X of center of rotation of deflection unit | −5.694370084 |
| Coordinate Y of center of rotation of deflection unit | −4.31 |
| Incident angle in main scanning direction [deg] | 90 |
| Incident angle in sub-scanning direction [deg] | 0 |
| Focal length in main scanning direction of fθ lens [mm] | 139.00 |
| Scanning field angle [deg] | 96.85 |
| Distance from exit surface of scanning lens to scanned surface [mm] | 115.10 |

| Shape of fθ lens | | | | |
|---|---|---|---|---|
| | First surface | | Second surface | |
| | Upper | Lower | Upper | Lower |
| R | 46.232 | 46.232 | 118.488 | 118.488 |
| K | 0.387 | 0.387 | 9.678 | 9.678 |
| B4 | −2.268763E−05 | −2.495555E−05 | −1.223422E−05 | −1.432364E−05 |
| B6 | 2.409256E−08 | 3.420478E−08 | 2.156274E−09 | 9.803942E−09 |
| B8 | −1.233671E−11 | −3.106190E−11 | 1.041885E−11 | −1.443434E−12 |
| B10 | −6.346578E−15 | 4.525352E−15 | −1.256345E−14 | −4.739446E−15 |
| B12 | 8.226965E−18 | 1.435658E−17 | 1.244924E−18 | −2.830253E−19 |
| B14 | 2.156041E−22 | −9.379311E−21 | 5.345577E−21 | 4.136905E−21 |
| B16 | −1.965076E−24 | 1.046040E−24 | −2.597308E−24 | −1.843752E−24 |
| r | −1.106276E+01 | −1.106276E+01 | −7.433101E+00 | −7.433101E+00 |
| E2 | 2.316338E−04 | 3.631580E−04 | 1.411376E−04 | 1.950120E−04 |
| E4 | −3.485662E−07 | −9.023576E−07 | −2.892302E−07 | −4.583980E−07 |
| E6 | 3.524841E−10 | 1.141126E−09 | 4.830574E−10 | 9.571510E−10 |
| E8 | −2.403259E−13 | −4.896779E−13 | −3.840964E−13 | −1.571831E−12 |
| E10 | 6.365771E−17 | −1.400836E−16 | 3.563015E−17 | 1.576810E−15 |
| E12 | −7.247077E−20 | 9.339748E−20 | 5.835932E−20 | −6.433128E−19 |
| E14 | −1.877827E−24 | 2.467374E−22 | −2.195228E−23 | −9.354892E−23 |
| E16 | 8.909400E−26 | −1.439553E−25 | 1.633171E−26 | 1.536879E−25 |

Note that, in Table and Table 2, the coordinates of the center of rotation are indicated with an intersection between the deflection unit and an on-axial principle ray at an image height of 0 being the origin. Moreover, "E-N" indicates $10^{-N}$.

Moreover, an aspherical shape of the scanning lens 5 in a meridional direction when the optical axis direction is defined as an X axis, the main scanning direction is defined as a Y axis, and the sub-scanning direction is defined as a Z axis is expressed by the expression (7) below. Curvature radii R, eccentricities K, and aspherical coefficients B4 to B16 of the scanning lenses 5 according to Numerical Example 1 and Numerical Example 2 are shown in Table 1 and Table 2, respectively.

$$X = \frac{Y^2/R}{1 + (1 - (1+K)(Y/R)^2)^{1/2}} + B_4 Y^4 + \qquad (7)$$
$$B_6 Y^6 + B_8 Y^8 + B_{10} Y^{10} + B_{12} B^{12} + B_{14} Y^{14} B_{16} Y^{16}$$

Moreover, an aspherical shape of the scanning lens 5 in a sagittal line direction is expressed by the expression (8) below. Curvature radii r and aspherical coefficients E2 to E16 of the scanning lenses 5 according to Numerical Example 1 and Numerical Example 2 are shown in Table 1 and Table 2, respectively.

$$\frac{1}{r'} = \frac{1}{r} + E_4 Y^4 + E_6 Y^6 + E_8 Y^8 + E_{10} Y^{10} + E_{12} Y^{12} + E_{14} Y^{14} + E_{16} Y^{16} \quad (8)$$

In the optical scanning apparatus 100 according to each of Numerical Example 1 and Numerical Example 2, the scanning lens 5 has the positive refractive power, and is formed of plastic.

Moreover, the scanning lens 5 according to each of Numerical Example 1 and Numerical Example 2 is formed of a so-called toric lens, in which a curvature in the sub-scanning section is different from a curvature in the main scanning section. Sub-scanning magnifications of the scanning lenses 5 according to Numerical Example 1 and Numerical Example 2 are −3.4 and −3.7, respectively.

In Table 3, correspondences with the above-mentioned conditional expressions (1) to (6) in the optical scanning apparatus 100 according to Numerical Example 1 and Numerical Example 2 of the present invention, and the optical scanning apparatus according to the first embodiment of Japanese Patent Application Laid-Open No. H08-76011 are shown.

TABLE 3

|  | Numerical Example 1 | Numerical Example 2 | First embodiment of Japanese Patent Application Laid-Open No. H08-76011 |
|---|---|---|---|
| Conditional expression (1) | 0.81 | 0.91 | 0.64 |
| Conditional expression (2) | 0.46 | 0.32 | 0.50 |
| Conditional expression (3) | −0.08 | −0.20 | −0.18 |
| Conditional expression (4) | 0.27 | 0.25 | 0.41 |
| Conditional expression (5) | 0.06 | 0.07 | 0.07 |
| Conditional expression (6) | 3.42 | 3.73 | 2.46 |
| $X_{1max}$ [mm] | 25.48 | 23.11 | 40.99 |
| $X_{10}$ [mm] | 21.73 | 20.40 | 36.00 |
| $X_{2max}$ [mm] | 29.25 | 27.52 | 44.25 |
| $X_{20}$ [mm] | 29.93 | 29.00 | 46.00 |

As shown in Table 3, as opposed to the optical scanning apparatus according to the first embodiment of Japanese Patent Application Laid-Open No. H08-76011, it can be seen that the optical scanning apparatus 100 according to each of Numerical Example 1 and Numerical Example 2 of the present invention satisfy all of the conditional expressions (1) to (6).

In particular, the value of the conditional expression (4) in the optical scanning apparatus according to the first embodiment of Japanese Patent Application Laid-Open No. H08-76011 is 0.41, which means that the scanning optical system is on the scanned surface side. In other words, the scanning optical system of the optical scanning apparatus 100 according to each of Numerical Example 1 and Numerical Example 2 of the present invention is located closer to the deflection unit side than the optical scanning apparatus in the related art, which means that the size is sufficiently reduced.

Figure 3A:
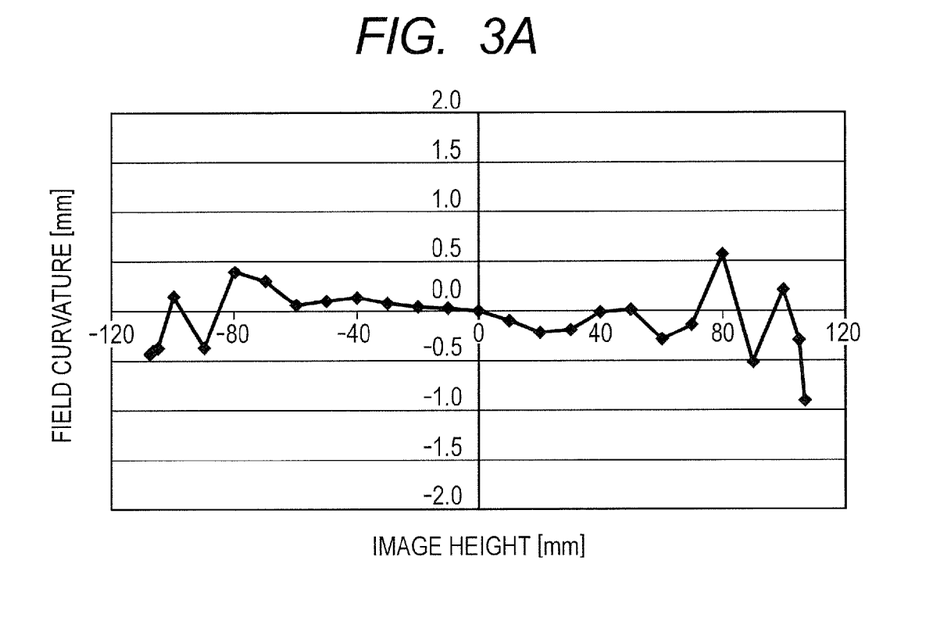
FIG. 3A is a graph for showing a relationship between field curvature in a main scanning direction and an image height in an optical scanning apparatus according to Numerical Example 1 of the present invention.
Figure 3B:
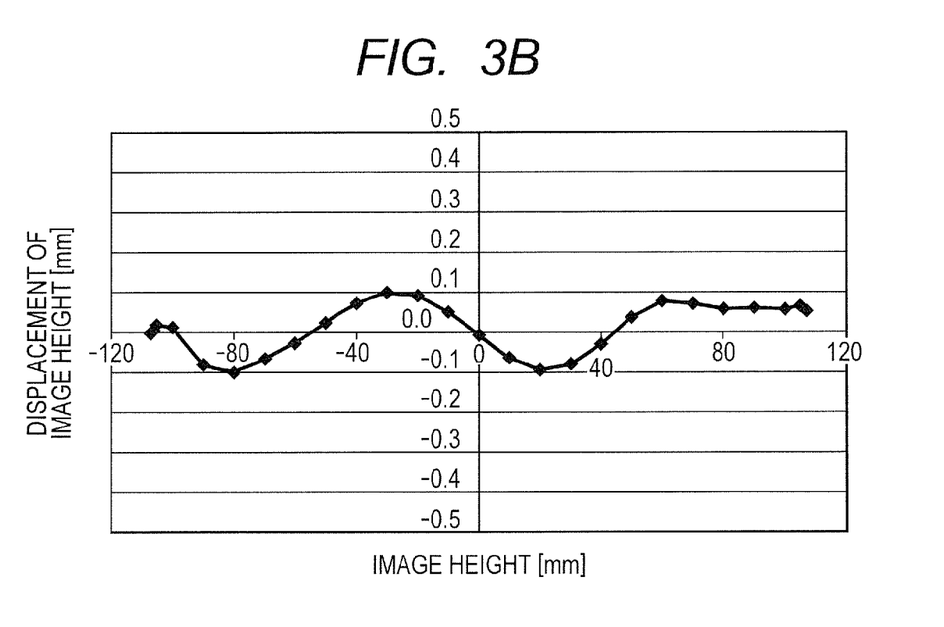
FIG. 3B is a graph for showing a relationship between a displacement of the image height in the main scanning direction and the image height in the optical scanning apparatus according to Numerical Example 1.

In FIG. 3A and FIG. 3B, a relationship between the field curvature in the main scanning direction and an image height and a relationship (fθ characteristics) between a displacement of the image height in the main scanning direction and the image height in the optical scanning apparatus 100 according to Numerical Example 1 are shown, respectively.

Figure 4A:
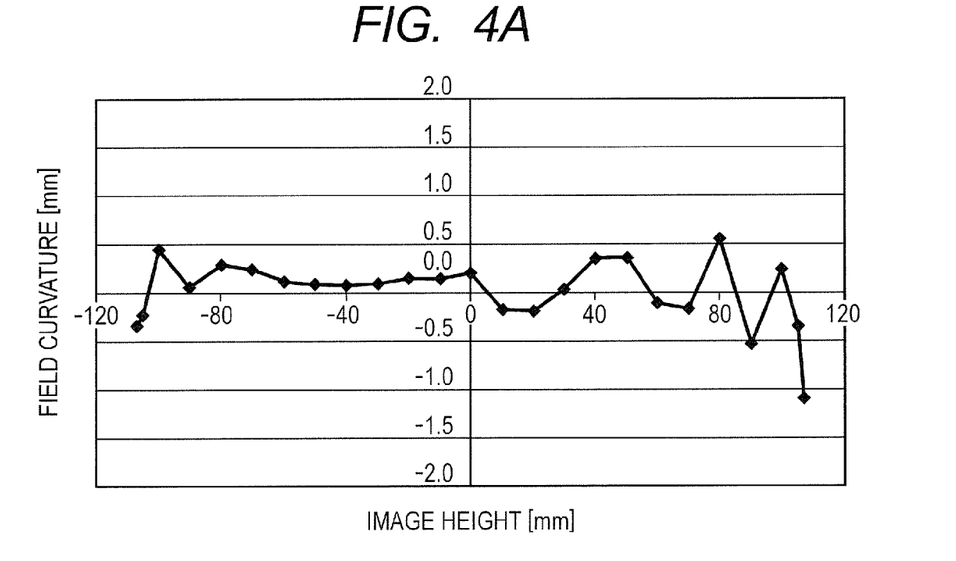
FIG. 4A is a graph for showing a relationship between field curvature in a main scanning direction and an image height in an optical scanning apparatus according to Numerical Example 2 of the present invention.
Figure 4B:
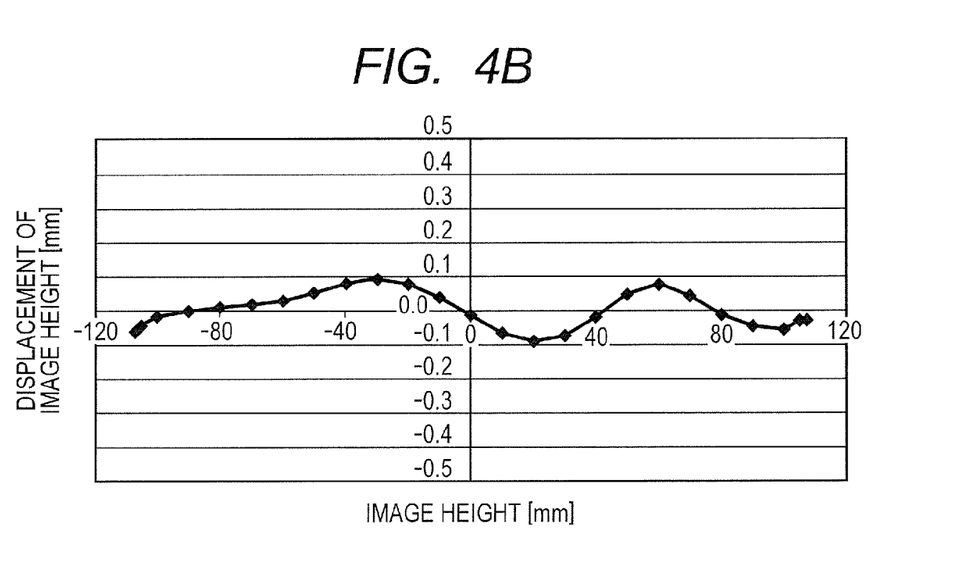
FIG. 4B is a graph for showing a relationship between a displacement of the image height in the main scanning direction and the image height in the optical scanning apparatus according to Numerical Example 2.

Similarly, in FIG. 4A and FIG. 4B, a relationship between the field curvature in the main scanning direction and an image height, and a relationship (fθ characteristics) between a displacement of the image height in the main scanning direction and the image height in the optical scanning apparatus 100 according to Numerical Example 2 are shown, respectively.

As shown in FIG. 3A, FIG. 3B, FIG. 4A, and FIG. 4B, it can be seen that both of the optical scanning apparatus 100 according to Numerical Example 1 and Numerical Example 2 have good aberrations and characteristics.

Figure 5:
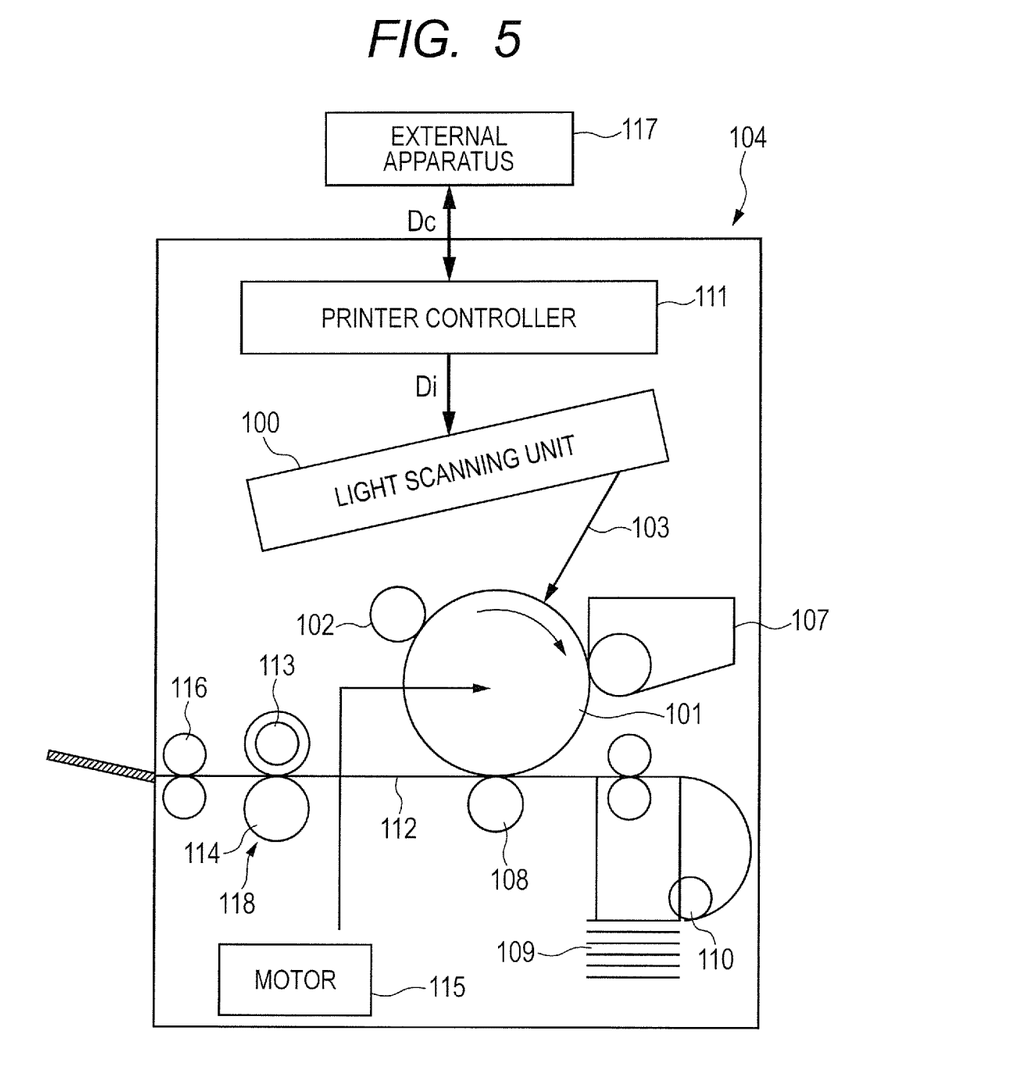
FIG. 5 is a cross-sectional view of a main part of an image forming apparatus in which the optical scanning apparatus according to the present invention is mounted.

FIG. 5 is a cross-sectional view of a main part of an image forming apparatus 104 in which the optical scanning apparatus (optical scanning unit) 100 according to the present invention is mounted.

The image forming apparatus 104 receives code data Dc output from an external apparatus 117 such as a personal computer as an input. The code data Dc is converted into image data (dot data) Di by a printer controller 111 in the apparatus. The image data (image signal) Di is input to the optical scanning unit 100.

A light beam 103 that has been modulated depending on the image data Di is irradiated from the optical scanning unit 100, and a photosensitive surface of a photosensitive drum 101 is scanned by the light beam 103 in the main scanning direction.

The photosensitive drum 101 serving as an electrostatic latent image bearing member (photosensitive body) is rotated clockwise by a motor 115. Then, along with this rotation, the photosensitive surface of the photosensitive drum 101 is moved in the sub-scanning direction, which is orthogonal to the main scanning direction, with respect to the light beam 103. On the photosensitive drum 101, a charging roller 102 configured to uniformly charge a surface of the photosensitive drum 101 is provided to abut against the surface. Then, the surface of the photosensitive drum 101, which has been charged by the charging roller 102, is irradiated with the light beam 103 scanned by the optical scanning unit 100. The photosensitive drum 101 may be regarded as being arranged at the position of the above-mentioned scanned surface 6.

As described above, the light beam 103 is modulated based on the image data Di, and this light beam 103 is irradiated to form an electrostatic latent image on the surface of the photosensitive drum 101. The electrostatic latent image is developed as a toner image by a developing unit 107, which is arranged to abut against the photosensitive drum 101 on a further downstream side in a direction of rotation of the photosensitive drum 101 than a position of irradiation with the light beam 103.

The toner image developed by the developing unit 107 is transferred onto a sheet of paper 112 serving as a transferred material by a transfer roller (transferring unit) 108, which is arranged below the photosensitive drum 101 to face the photosensitive drum 101. The sheet of paper 112 is stored in a paper cassette 109 in front (in FIG. 5, to the right) of the photosensitive drum 101, but may also be manually fed. A feed roller 110 is arranged at an end of the paper cassette 109, and is configured to feed the sheet of paper 112 in the paper cassette 109 onto a conveyance path.

As described above, the sheet of paper 112 onto which an unfixed toner image has been transferred is further conveyed to a fixing unit 118 behind (in FIG. 5, to the left of) the photosensitive drum 101. The fixing unit 118 is formed of a fixing roller 113 including a fixing heater (not shown) therein, and a pressure roller 114 arranged to be in press contact with the fixing roller 113. The sheet of paper 112 that has been conveyed from the transferring unit is heated while being pressed at a portion at which the fixing roller 113 and the pressure roller 114 are brought into press contact with each other, with the result that the unfixed toner image on the sheet of paper 112 is fixed. Further, discharging rollers 116 are arranged behind the fixing roller 113 to discharge the sheet of paper 112 onto which the toner image has been fixed to the outside of the image forming apparatus 104.

Note that, the printer controller 111 is configured not only to convert the image data but also to control the motor 115 and other such parts in the image forming apparatus 104, a polygon motor in the optical scanning unit 100, and the like.

The exemplary embodiment of the present invention is described above, but the present invention is not limited to the embodiment and can be modified and changed variously within the scope of the gist thereof.

According to the present invention, the scanning optical system may be formed of one appropriately designed lens to provide the optical scanning apparatus realizing both an increase in definition and the reduction in cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-072378, filed Mar. 31, 2015, and Japanese Patent Application No. 2016-030654, filed Feb. 22, 2016, which are hereby incorporated by reference herein in their entirety.

What is claimed is:

1. An optical scanning apparatus, comprising:
a deflection unit configured to deflect a light flux to scan a scanned surface with the light flux in a main scanning direction; and
an imaging optical element configured to guide the light flux that has been deflected by the deflection unit onto the scanned surface,
wherein the following conditional expressions are satisfied:

$0.65 < f_\theta/f_s < 1.00$ $0.30 < (X_{1max} - X_{10})/(X_{20} - X_{10}) < 0.49$ $-0.24 < (X_{2max} - X_{20})/(X_{20} - X_{10}) < -0.06$ where $f_\theta$ represents an f$\theta$ coefficient of the imaging optical element, $f_s$ represents a focal length of the imaging optical element, and when an intersection between the deflection unit and an optical axis of the imaging optical element is set as an origin, $X_{1max}$ (mm) represents a coordinate in an optical axis direction of an intersection between a principal ray of an outermost off-axis light flux and an incident surface of the imaging optical element, $X_{2max}$ (mm) represents a coordinate in the optical axis direction of an intersection between the principal ray of the outermost off-axis light flux and an exit surface of the imaging optical element, $X_{10}$ (mm) represents a coordinate in the optical axis direction of an intersection between a principal ray of an on-axis light flux and the incident surface, and $X_{20}$ (mm) represents a coordinate in the optical axis direction of an intersection between the principal ray of the on-axis light flux and the exit surface.

2. An optical scanning apparatus according to claim 1, wherein the following conditional expression is satisfied:

$0.20 \leq T2/Sk \leq 0.30$ where T2 represents a distance from a deflecting surface of the deflection unit to the exit surface, and Sk represents a distance from the exit surface to the scanned surface.

3. An optical scanning apparatus according to claim 1, wherein the following conditional expression is satisfied:

$0.05 \leq d/f_\theta \leq 0.08$ where d is a thickness of the imaging optical element.

4. An optical scanning apparatus according to claim 1, wherein the following conditional expression is satisfied:

$3.0 < |\beta s| < 4.0$ where $\beta s$ represents a paraxial lateral magnification in a sub-scanning section of the imaging optical element.

5. An image forming apparatus, comprising:
an optical scanning apparatus,
the optical scanning apparatus comprising:
a deflection unit configured to deflect a light flux to scan a scanned surface with the light flux in a main scanning direction; and
an imaging optical element configured to guide the light flux that has been deflected by the deflection unit onto the scanned surface;
a developing unit configured to develop as a toner image an electrostatic latent image formed by the optical scanning apparatus on the scanned surface;
a transferring unit configured to transfer the developed toner image onto a transferred material; and
a fixing unit configured to fix the transferred toner image onto the transferred material,
wherein the optical scanning apparatus satisfies the following conditional expressions:

$0.65 < f_\theta/f_s < 1.00$ $0.30 < (X_{1max} - X_{10})/(X_{20} - X_{10}) < 0.49$ $-0.24 < (X_{2max} - X_{20})/(X_{20} - X_{10}) < -0.06$ where $f_\theta$ represents an f$\theta$ coefficient of the imaging optical element, $f_s$ represents a focal length of the imaging optical element, and when an intersection between the deflection unit and an optical axis of the imaging optical element is set as an origin, $X_{1max}$ (mm) represents a coordinate in an optical axis direction of an intersection between a principal ray of an outermost off-axis light flux and an incident surface of the imaging optical element, $X_{2max}$ (mm) represents a coordinate in the optical axis direction of an intersection between the principal ray of the outermost off-axis light flux and an exit surface of the imaging optical element, $X_{10}$ (mm) represents a coordinate in the optical axis direction of an intersection between a principal ray of an on-axis light flux and the incident surface, and $X_{20}$ (mm) represents a coordinate in the optical axis direction of an intersection between the principal ray of the on-axis light flux and the exit surface.

6. An image forming apparatus, comprising:
an optical scanning apparatus,
the optical scanning apparatus comprising:
a deflection unit configured to deflect a light flux to scan a scanned surface with the light flux in a main scanning direction; and
an imaging optical element configured to guide the light flux that has been deflected by the deflection unit onto the scanned surface; and
a printer controller configured to convert code data, which is output from an external apparatus, into an image signal and input the image signal to the optical scanning apparatus, wherein the optical scanning apparatus satisfies the following conditional expressions:

$$0.65 < f_\theta/f_s < 1.00$$

$$0.30 < (X_{1max} - X_{10})/(X_{20} - X_{10}) < 0.49$$

$$-0.24 < (X_{2max} - X_{20})/(X_{20} - X_{10}) < -0.06$$

where $f_\theta$ represents an fθ coefficient of the imaging optical element, $f_s$ represents a focal length of the imaging optical element, and when an intersection between the deflection unit and an optical axis of the imaging optical element is set as an origin, $X_{1max}$ (mm) represents a coordinate in an optical axis direction of an intersection between a principal ray of an outermost off-axis light flux and an incident surface of the imaging optical element, $X_{2max}$ (mm) represents a coordinate in the optical axis direction of an intersection between the principal ray of the outermost off-axis light flux and an exit surface of the imaging optical element, $X_{10}$ (mm) represents a coordinate in the optical axis direction of an intersection between a principal ray of an on-axis light flux and the incident surface, and $X_{20}$ (mm) represents a coordinate in the optical axis direction of an intersection between the principal ray of the on-axis light flux and the exit surface.

\* \* \* \* \*